May 31, 1960 E. P. LARSH ET AL 2,938,250
METHOD AND APPARATUS FOR MOLDING
Filed Feb. 3, 1958 5 Sheets-Sheet 5
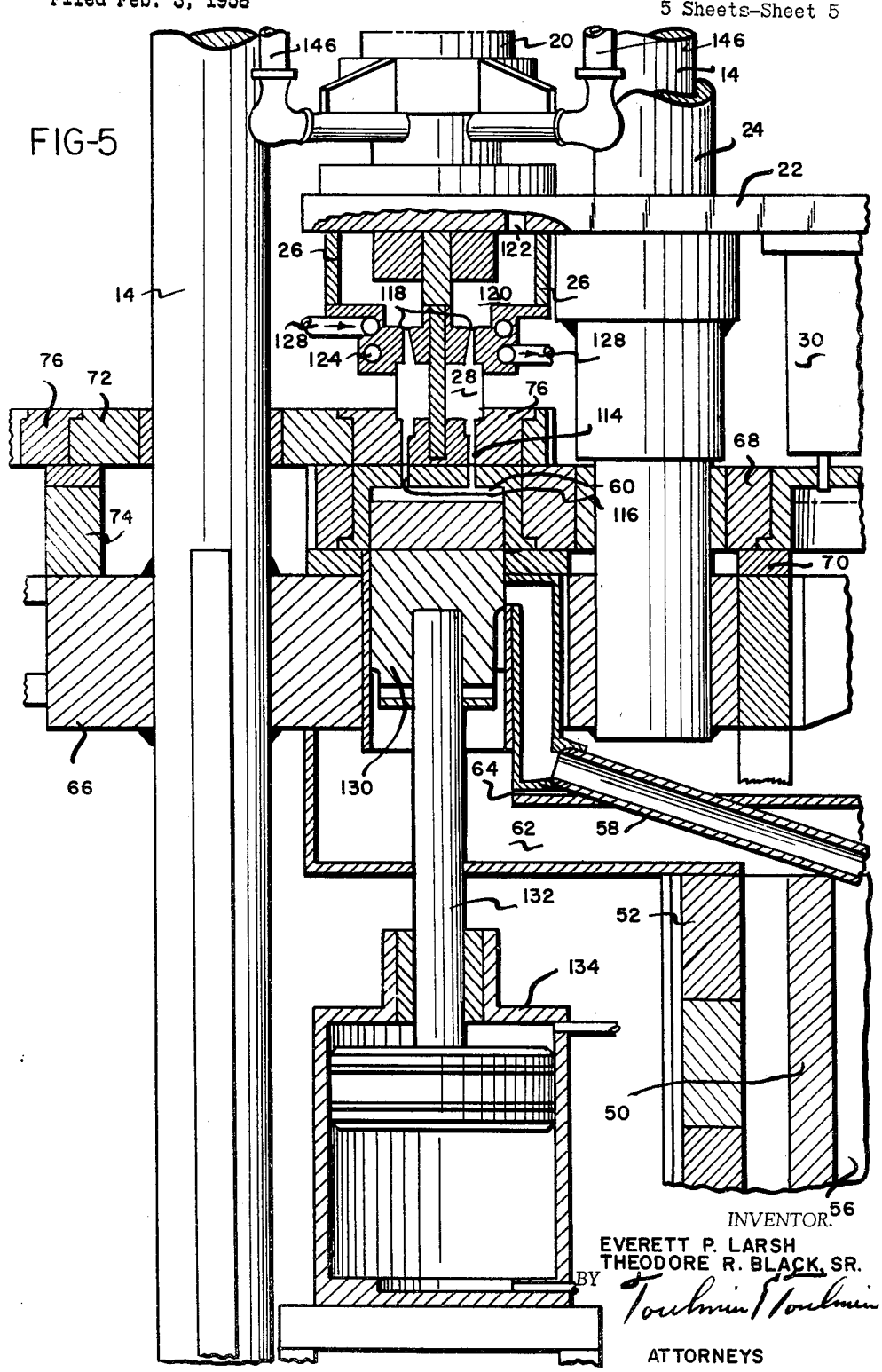
INVENTOR.
EVERETT P. LARSH
THEODORE R. BLACK, SR.
BY
ATTORNEYS

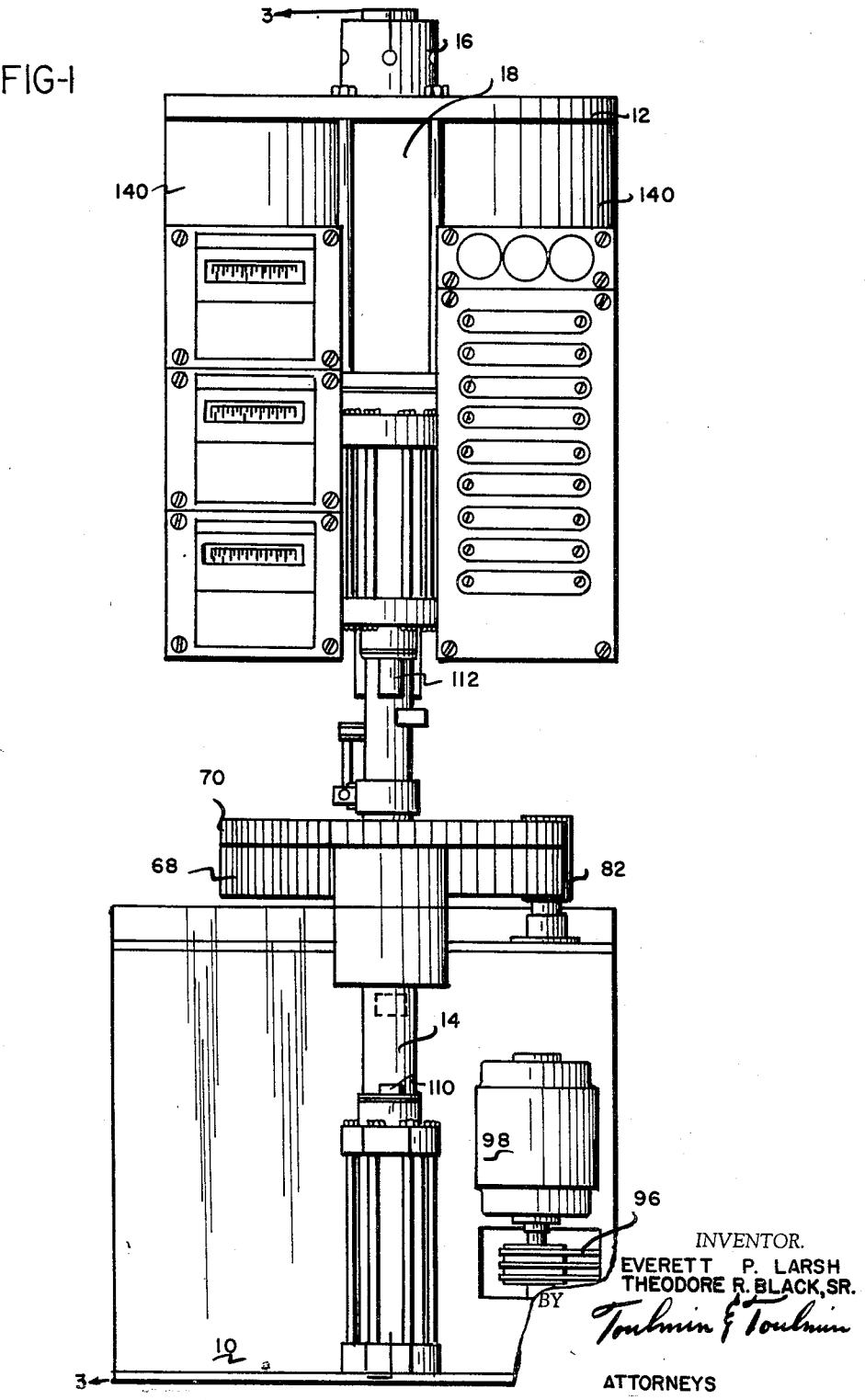

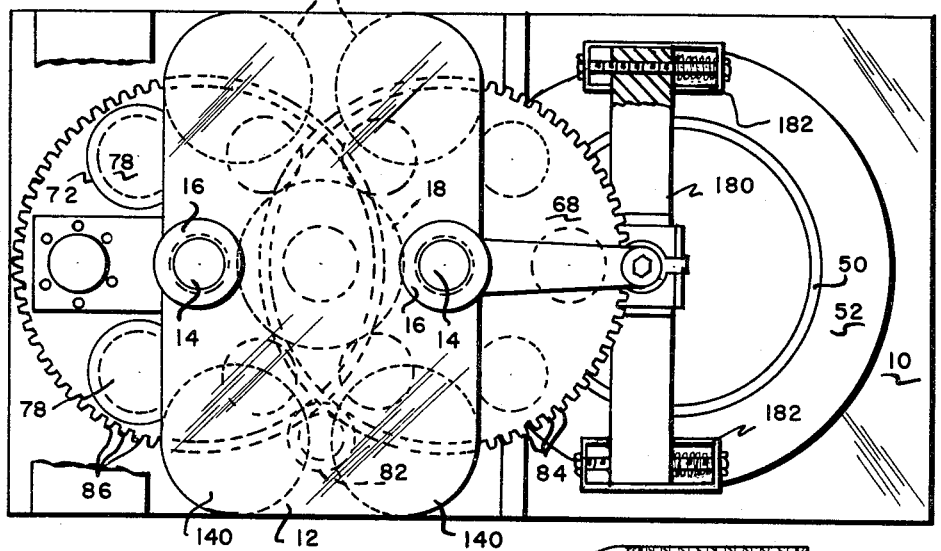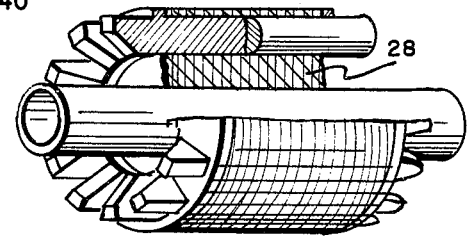

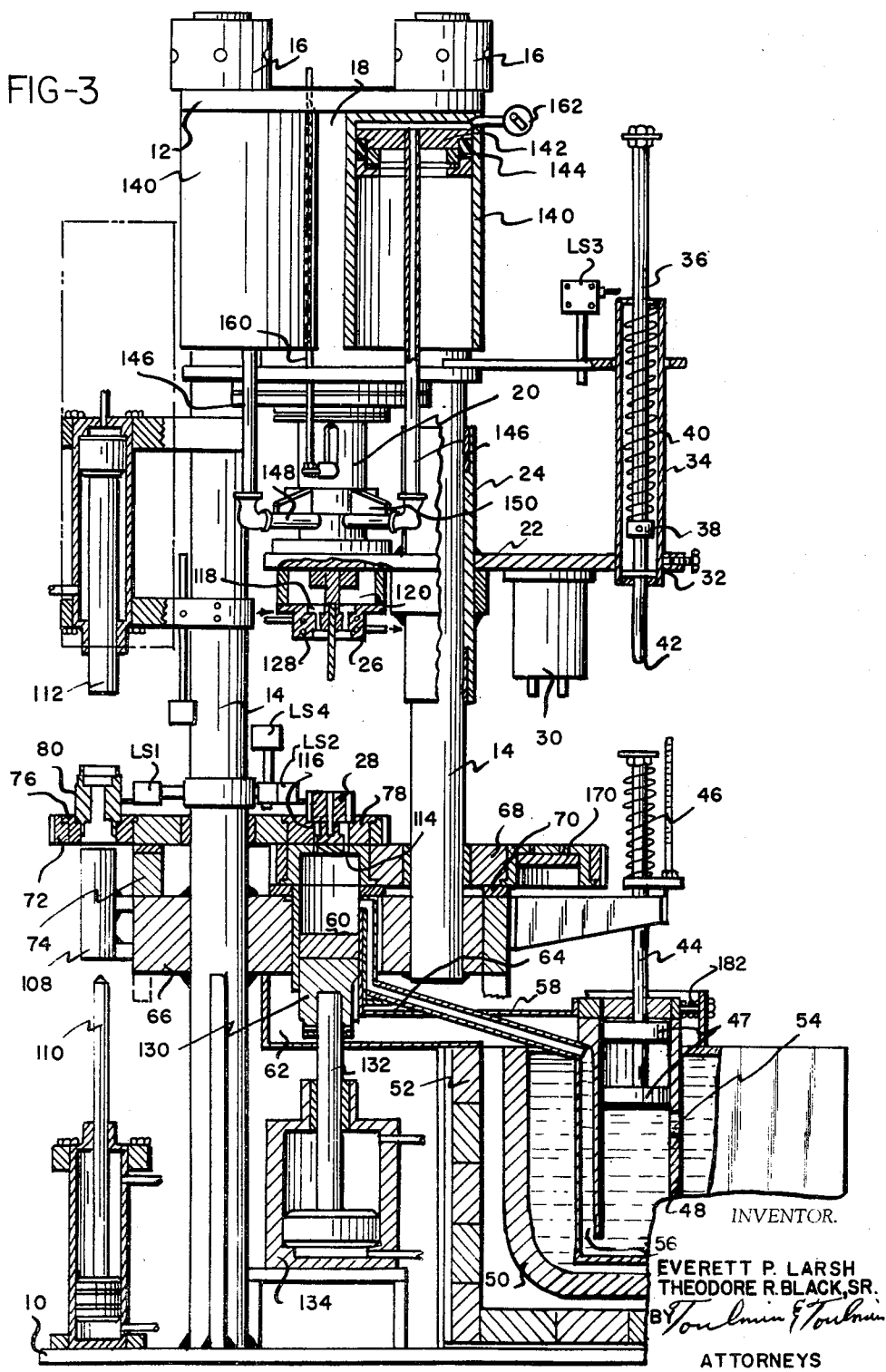

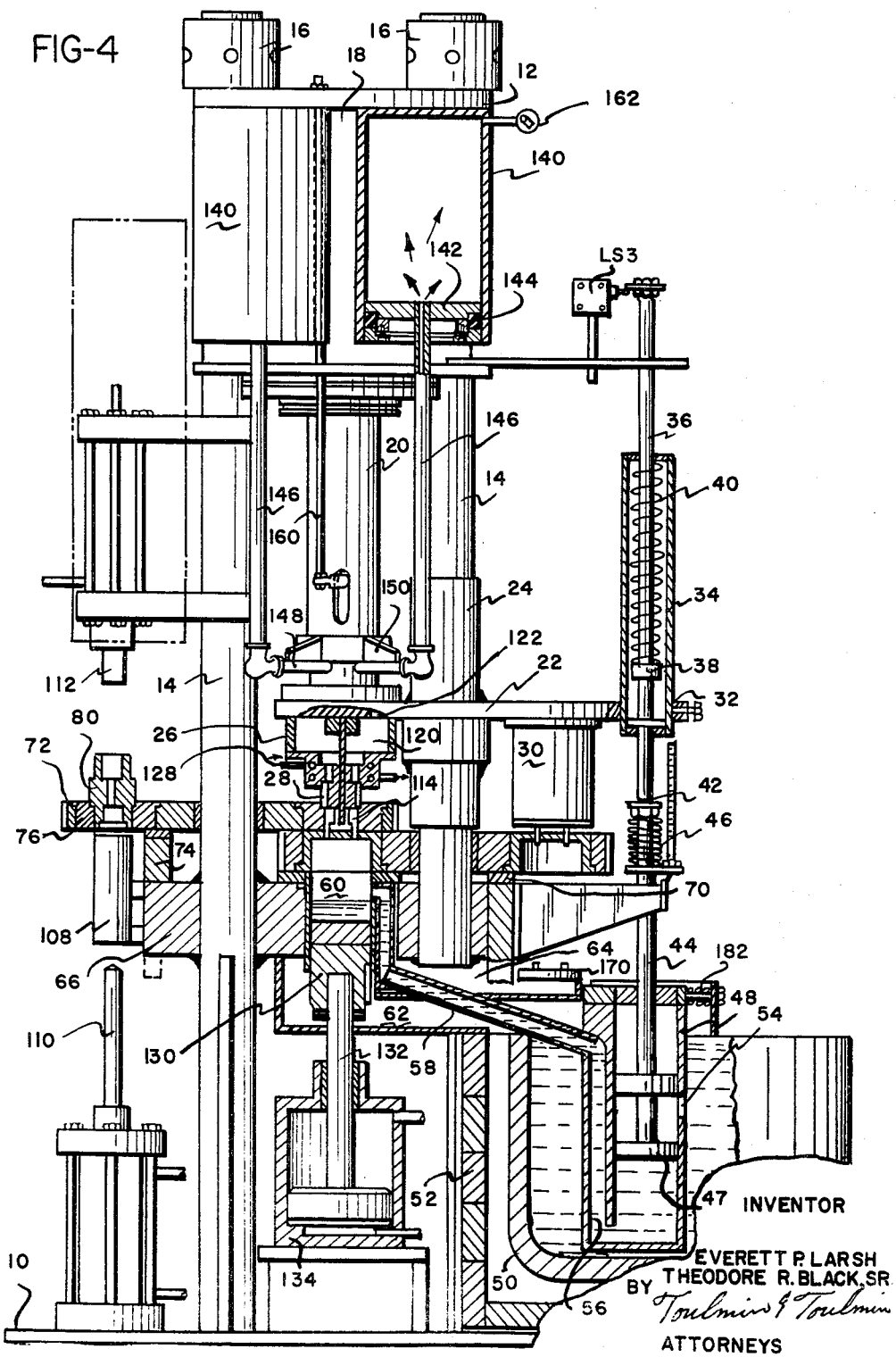

United States Patent Office 2,938,250
Patented May 31, 1960

2,938,250
METHOD AND APPARATUS FOR MOLDING

Everett P. Larsh and Theodore R. Black, Sr., Dayton, Ohio; said Black, Sr., assignor to said Larsh Filed Feb. 3, 1958, Ser. No. 712,882

10 Claims. (Cl. 22—68)

This invention relates to an improved method and apparatus for molding or casting and is particularly concerned with a method and apparatus for carrying out die casting operations.

In the art of forming articles by casting or molding the material being handled is rendered flowable usually by the application of heat, and is then forced into a mold cavity or the like under pressure. This general type of process is carried out in the molding of plastic materials and also in the molding of metals, particularly with metals of the die casting class because such metals become fluid at relatively low temperatures and can thus be cast into metal molds.

In most cases where such moldings or castings are to be made the material is forced into a closed cavity or the like and this requires that any air or gas within the cavity will be forced out by the material or be withdrawn in some manner so that the cavity can be completely filled. With plastic molding compositions this is not a particularly serious problem because such materials do not set up quickly but with the casting of metals as in the case of die casting processes the mold metal will crystallize very quickly and it is therefore important that it be pushed into the mold cavity at high speed and a pressure developed thereon before the metal chills and commences to crystallize.

Having the foregoing in mind, one of the principal objects of the present invention is the provision of an improved method and apparatus for carrying out molding and casting processes in which more rapid and more complete filling of the mold cavity can be had.

Another object of this invention is the provision of a method and apparatus for die casting metals in which an extremely high vacuum can be drawn quickly on the mold cavity thereby permitting extremely rapid and complete filling of the mold cavity.

Another object of this invention is the provision of a method and apparatus for evacuating mold cavities into which mold materials are to be cast and which mechanism for causing the evacuation is an integral part of the casting apparatus.

In the usual molding machine, or casting apparatus, mold halves are brought together and the material to be formed therein is forced into the mold cavity and thereafter the mold parts are separated and the molded article ejected therefrom. Such a molded article will ordinarily carry the runners or sprues and possibly risers and flash through air bleed openings that must subsequently be trimmed off in a separate operation.

Further, the opening of the mold halves must be sufficient to provide ample clearance for the molded article to drop therefrom with the said sprues and runners attached thereto.

With this in mind, a still further object of this invention is the provision of an improved method and apparatus for carrying out molding operations, including die casting in which the molded article emerges from the molding station substantially free of sprues or runners or other unwanted excessive pieces of the molding material.

Another object is the provision of a method and apparatus for molding die castings in which the minimum amount of opening is required to release the molded workpiece from the machine.

A particular object of this invention is the provision of an improved method and apparatus for automatically die casting squirrel cage windings into electric motor rotors.

It is also an object of this invention to provide an improved method and apparatus for die casting windings into electric motor rotors which is readily adaptable to a plurality of sizes of rotors without any substantial change in the structure of the machine.

Referring to the drawings somewhat more in detail:

Figure 1 is a front elevational view showing the appearance of an automatic machine according to the present invention as it might appear looking in from the control panel side thereof;

Figure 2 is a plan view looking down on top of the machine;

Figure 3 is a vertical transverse section indicated by line 3—3 on Figure 1 showing the machine open and with a workpiece in position for being operated;

Figure 4 is a view like Figure 3 but shows the machine closed on the workpiece and immediately prior to the transfer of the molding composition to the workpiece;

Figure 5 is a view drawn at enlarged scale and showing the die casting material transferred into the cavity which it is to occupy;

Figure 6 is a fragmentary view showing the drive that drives the turrets of the machine, one of which receives the workpiece to be operated;

Figure 7 is a sectional view showing a valve provided for the purpose of controlling the application of suction to the mold cavity into which the molding material is to be forced; and Figure 8 is a sectional view showing an electric motor rotor that has been provided with a cast winding according to this invention.

Referring to the drawings somewhat more in detail, the embodiment of the present invention that is illustrated therein comprises a generally press-like machine having a base plate 10 and top plate 12 which are interconnected by a pair of spaced strain rods 14. Nuts 16 on the upper ends of the strain rods sustain pressing thrusts that are exerted on top plate 12 and the lower ends of strain rods may likewise have nuts thereon or may be welded to base 10. Both of the rods 14 extend completely to the base plate 10 or one thereof may be terminated above the base plate as will be seen in Figures 3 and 4.

Located in about the center of top plate 12 is a cylinder 18 of a double acting hydraulic motor including ram 20 movable vertically in the machine upon a reversible supply of hydraulic fluid to cylinder 18.

Ram 20 has attached thereto a head 22 that comprises a sleeve 24 that is reciprocal on one of the strain rods 14. Head 22 has in alignment with ram 20 a die member or top mold part 26 which is adapted for engaging the upper end of a workpiece 28 that is to be operated but which die member or mold part may also comprise a complete mold half according to the present invention adapted for engaging another stationarily mounted mold half located in vertical alignment therewith.

Head 22 also has mounted thereon on the opposite side of the strain rod on which it slides from the die member, an ejector unit 30 which, as will be seen hereinafter is utilized for automatically ejecting sprues and molding material residue at the end of each molding or casting cycle.

The head 22 also engages a collar 32 which reciprocates with the head and which collar is attached to the lower end of sleeve 34. Sleeve 34 is reciprocable on a rod 36. Rod 36 is provided with a collar 38 and a compression spring 40 bears between the top of the collar and the upper end of sleeve 34. This arrangement provides for urging rod 36 resiliently downwardly when head 22 moves downwardly. Rod 36, at 42, abuts the upper end of a piston rod 44 that is spring urged upwardly by a spring 46. Rod 44 has piston means 47 thereon reciprocable within a cylinder 48 and which cylinder is located with a crucible 50 in which the mold material, in this case die casting material, is maintained in a molten state. The crucible may be of ceramic or Carborundum or fire clay or a heat resistant steel or like material according to practices well known in the art and is located within a fire chamber 52 to which heat is supplied, as by a gas flame for retaining the metal therein molten.

There is a port 54 in the side of cylinder 48 and as will be seen in Figure 3, when the press ram 20 and head 22 therein are fully retracted, the rod 36 is lifted upwardly thereby permitting spring 46 to retract rod 44 to a point where the port 54 will be uncovered thus permitting molten metal to flow into the cylinder 48.

When the press ram and head advance downwardly for another work operation, the rod 36 resiliently urges rod 44 and the piston means 47 connected therewith downwardly and displaces the molten metal through channel 56 and tube 58 into a chamber 60 whence the molten metal is transferred into the mold cavity or to the workpiece being operated.

In this connection, it will be observed that the exhaust gases from the fire box 52 are caused to pass through a channel 62 and thence outwardly through another channel 64 so that substantially the entire length of tube 58 is maintained at such a temperature that the metal will be maintained in a molten state.

The machine comprises a bed plate or bolster 66 of substantial size which is preferably attached rigidly to rods 14. This member forms the stationary bed that supports the clamping thrusts of ram 20. According to the present invention each of strain rods 14 has a member rotatably mounted thereon above bed plate 66. The right hand strain rod, as it is viewed in Figures 3 and 4, has a turret member 68 rotatable thereon and which turret member may be supported by a bearing surrounding the strain rod and with there also being a thrust ring 70 between the turret and the bed plate.

Rotatably mounted on the left hand strain rod is a second turret member 72 which may also have a bearing about its pertaining strain rod and which rests on the first mentioned turret member beneath ram 20 and may be supported on a bearing block 74 on its opposite side.

The second turret member 72 is provided with a plurality of apertures 76 that receive mold parts 78 which may comprise mold halves or which may engage one end of a workpiece to be operated as is indicated at 80 in the drawing and which workpiece, in the embodiment illustrated, comprises a motor rotor. The mold parts 78 are removable from turret member 72 so that they can be replaced by others of different sizes, if desired.

Reference to Figures 2 and 6 will show that the turret members 68 and 72 are provided with peripheral teeth or with ring gear elements mounted thereon, the said gear teeth or ring gear elements being of the same size so that a pinion 82 can be provided meshing with the teeth 84 on turret member 68 and teeth 86 on turret member 72 so that rotation of pinion 82 will cause simultaneous rotation of the turret members and through equal angles.

Pinion 82 is mounted on a shaft 88 that carries a gear 90 engaged by a small pinion 92 on a shaft 94 that is belt connected as by belts 96 with an electric drive motor 98. It will be apparent that energization of motor 98 will cause rotation of the aforementioned turrets.

For controlling the amount of rotation of the turrets, shaft 88 may be provided at its lower end with a small gear 100 running on a larger gear 102 that carries a cam 104 for cooperation with a limit switch 106. By a proper selection of the size of gears 100 and 102 the turret elements can be caused to index automatically through any predetermined angle. In this manner diametrically opposite mold elements can be made successfully effective, or the turret elements can be caused to index through say, angles of 90°, if provided with four stations, whereby cleaning and loading and unloading operations and the like could be performed while another molding or casting operation is in process.

As illustrated, the turret elements have six stations and will ordinarily index either 180° or 60° depending upon whether or not such cleaning and preparatory, loading or unloading operations are to be performed at intermediate stations.

In the case of the electric motor rotor being provided with a die cast winding, it is preferable to insert a shaft into the rotor after the winding has been cast therein and prior to the rotor becoming completely cooled whereby the shafts can easily be inserted into the rotors whereupon the shrinkage of the rotors will cause them tightly to grip the shafts.

According to the present invention this is accomplished in a work station diametrically opposite the molding or casting station in turret elements 72 by providing a shaft feeding station 108 beneath the turret and in vertical alignment with the rotor carried thereby when the turret element is indexed. Beneath the shaft feeding station is a vertically reciprocable ram 110 operable for engaging the shaft in feeding position and for forcing it vertically upwardly into the rotor. The rotor is adapted for being held down in position by a second vertically reciprocable ram 112 located above the rotor and which is urged downwardly by hydraulic pressure against the upper part of the rotor so as to hold it in place while the shaft is inserted.

Returning now to the actual molding or casting station, as will be seen in Figures 3, 4 and 5, the mold parts 78 are adapted for engaging the lower end of the rotor 80 which is to have a winding cast therein. The lower mold part 78 is provided with passage means 114 opening downwardly therethrough and communicating via other passage means 116 in the lower turret member 68 with the chamber 60 to which the molten metal being used in the casting process is delivered when the press head moves downwardly.

The upper mold part or die member 26 engages the upper end of the rotor and also has passages 118 therein that open into a cavity 120 that communicates through channel 122 with a valve mechanism located within the press ram and which is illustrated in Figure 7.

The passages 118 in the upper die element or mold part may be surrounded by cooling passage means 124 and a cooling fluid may be passed therethrough via conduit means 128 thereby to chill the upper die member if necessary so that the molding material will set up therein before entering chamber 120. By tapering the passages 118 as illustrated, it will be evident that the workpiece can readily be removed from the upper die member merely by retraction of the ram.

With reference to the forcing of the molding material or die casting material into the mold cavity or the workpiece being operated, the lower end of chamber 60 is closed by a transfer piston 130 mounted on the upper end of the ram 132 extending into a hydraulic motor 134 for being actuated thereby.

It will be evident that thrusting upwardly of piston 130 will cause the molten material transferred into chamber 60 to be pushed upwardly through the passage means 116 and 114 into the mold cavity, or as in the case illustrated, into the slots of rotor 80 whereby to flow therethrough and then upwardly into passages 118 where the material is chilled and sets up hard.

It has previously been mentioned that it is desired to evacuate the mold cavity or the passages in the workpiece being operated prior to the casting operation. According to the present invention this is accomplished in a unique manner by mounting a plurality of cylinders 140 on the under side of top plate 12 and in each of which cylinders there is a piston 142 sealed thereto as by packing means 144. Each piston has a piston rod connected therewith and extending downwardly in the form of a tubular element or pipe 146. Each tubular piston rod 146, as will best be seen in Figure 7, is connected by a horizontal tube 148 with the lower end of ram 20. Brace elements 150 may be provided between the ram and the horizontal tubes 148 thereby to prevent bending of the said horizontal tubes when the ram moves downwardly.

The several tubes 148 open into the hollow lower end 152 of the ram 20 and this hollow lower end of the ram communicates directly with the aforementioned passage 122 that opens into chamber 120 of the upper die member 126.

A valve member 154 is provided in the ram that normally closes off the ends of the tubes 148 and this valve member is provided with a rod or actuating element 156 extending through a slot 158 in the ram and having connected therewith a rod 160 extending upwardly through the top plate 12 so that when the ram reaches a predetermined advanced position, the valve member will be pulled upwardly thus connecting tubes 148 with the hollow lower end of the ram and thence through passage means 122 with chamber 120.

When the ram retracts, the valve member will again be moved downwardly toward the end of the retracting movement thereby again to close off the ends of tubes 148. The closing of the valve could be accomplished at any time during the retracting stroke merely by providing the upper end of the cylinder 140 with the outwardly opening check valves 162.

It will be evident that advancing movement of ram 20 will cause the pistons 142 to be drawn downwardly in their respective cylinders creating suction which will be communicated via rods 146 and tubes 148 to the lower end of ram 20 and at about the time the upper die member 26 closes on the work member, valve member 154 will be pulled upwardly thus communicating the suction with chamber 120 and the cavities to be filled with mold material or molten die casting material and this will cause extremely rapid and substantially complete evacuation of the space to be filled whereupon upward movement of the molding plunger will cause extremely rapid transfer of the molding material into the cavity to be filled and whereby extremely dense, void and air pocket free moldings or castings can be made.

After the molding or casting operation is completed, and the piston 130 is retracted, upward movement of the ram 20 will cause the upper die member 26 to separate from the work member because the molding material has been chilled and set up in passage 118 but there is a continuous body of material extending through passages 114 and 116 and into the upper end of chamber 60.

Another feature of the present invention becomes operative in connection with the removal of the excessive molding or casting material from the workpieces when the turret elements commence to rotate. At this time the right hand turret element 68 moves relative to the left hand turret element 72 and the sprues or runners of the molding or casting material extending through the passages 114 and 116 are sheared off and the excessive material travels with turret 68 while the member carried by turret 72 is substantially free of all excessive material that would require additional trimming operations.

As will be seen in Figure 4, the said excessive material that is retained by turret 68, is ejected therefrom by ejector unit 30 in the form of a slug 170 which drops directly into crucible 50 as will be seen in Figure 4.

It will be evident that the described arrangement is such that the chamber 60 is completely cleared of molding material on each cycle so that repetitive molding or casting operations can be carried out and a high rate of production will obtain.

The adjustability of tube 34 on head 22 permits adjustment of the amount of material transferred each time the press closes so that for relatively small workpieces, of the nature illustrated, only a small amount of material may be transferred to chamber 60 while for larger pieces the stroke of the piston means 47 can be increased thereby causing transfer of more molding material. Since the press will close rapidly, the spring 40 permits rapid closing of the mold parts while the transfer of the molding material, in this case molten metal, takes place at a reduced rate. A gage rod may be provided that will indicate the travel of rod 44 and piston means 47 so that the machine can be adjusted for different set ups.

The piston means 47 as well as the transfer piston 130 may be formed of ceramic or provided with a ceramic facing in order to withstand the high temperatures encountered in handling the molten molding metal.

Since the temperature of tube 58 will vary considerably from time to time, it is convenient to provide the tube with rounded end parts and to hold the tube somewhat in compression by supporting cylinder 48 on a cross bar 180 which is urged by compression springs 182 toward the tube. This permits expansion and contraction of the tube without breaking the seal between the cylinder and chamber 60.

It will be evident that a machine of the nature disclosed would have automatic controls for controlling the cycling and for interlocking the various operations and for safety reasons. While no specific control circuit is illustrated it will be evident that such a control system would comprise limit switches for detecting the presence or absence of parts to be operated as well as the positions of the various parts, for example, there is illustrated in Figure 3 a limit switch LS1 which may be utilized for detecting the presence of a work member in the station where the shaft is pressed into the rotor. Similarly, a limit switch LS2 may be provided for detecting the presence of a rotor in the molding station so that the press would not close unless a rotor was in position to be operated.

Also, the transfer piston could be controlled in its operation by a limit switch LS3 positioned to be operated by rod 36 at the moment the rod completed its advancing stroke thus indicating the transfer into chamber 60 of the proper amount of material. This will enable the transfer piston to be driven upwardly at exactly the right moment so that no time would be lost.

The valve 154 controlling the connection of the mold cavity with the source of suction developed in the cylinder 140 has been shown as being operated in response to travel of the ram 20 in its advancing direction. However, it will be evident that there could be provided switch means to detect the moment of closing of the upper mold part of the workpiece, such switch means, for example, being illustrated at LS4 and this switch means utilized for energizing a solenoid or motor or air cylinder or the like for actuating the valve 154. In this manner the mold would be completely closed before the valve is opened and thus no loss of suction would take place.

Similarly, it may be preferable where it was desired to operate the valve by the motion of ram 20, to provide means for sealing the mold cavity before the mold parts were completely closed. This could take the form of sealing sleeve means within which the mold parts could move relatively to each other after reaching a closed position.

In the case of the work member illustrated, and which is an electric motor rotor, it will be understood that the slots or apertures into which the bars of the winding are to be cast could be open about the periphery of the rotor, or closed. If closed it would not be necessary to provide a surrounding sleeve on the rotor but if the slots were open, or if the wall thickness were extremely thin, it will be preferable to surround the rotor with a sealing sleeve so that no loss of the die casting material would occur outwardly through the periphery of the rotor.

It will be understood that this invention is susceptible to modification in order to adapt it to different usages and conditions; and, according, it is desired to comprehend such modifications within this invention as may fall within the scope of the appended claims.

We claim:

1. In a molding machine; a first mold part, a second mold part movable into cooperative relation with the first mold part to define a cavity for receiving molding material, a reciprocable motor connected with said second mold part for moving it to and from the first mold part, a suction pump connected with and actuated by said motor during movement of the second mold part toward the first mold part, and valve means between the said suction pump and the mold cavity adapted for connecting the mold cavity with the suction pump when the mold parts close thereby to evacuate gases from the cavity.

2. In a die casting machine; a first mold part, a second mold part movable into cooperative relation with the first mold part to define a cavity for receiving die casting material, a reciprocable motor supporting the second mold part operable to move the second mold part toward the first mold part, piston-cylinder means connected between the movable part of said motor means and a stationary point forming a suction pump operable for developing a reduced pressure in the cylinder as the second mold part is moved toward the first mold part, a valve between the cylinder and the mold cavity, and means for opening the valve when the mold parts close whereby gases are evacuated from the cavity.

3. In a die casting machine; a first mold part, a second mold part movable into cooperative relation with the first mold part to define a cavity for receiving die casting material, a reciprocable motor supporting the second mold part operable to move the second mold part toward the first mold part, piston-cylinder means connected between the movable part of said motor means and a stationary point forming a suction pump operable for developing a reduced pressure in the cylinder as the second mold part is moved toward the first mold part, a valve between the cylinder and the mold cavity, and means for opening the valve when the mold parts close whereby gases are evacuated from the cavity, there being means for injecting die casting material into the cavity through said first mold part.

4. In a die casting machine; a bed, a first mold part on the bed, a second mold part movable toward and away from the first mold part and adapted for defining a cavity therewith, a reciprocable motor supporting the second mold part and operable for moving the second mold part toward and away from the first mold part, a piston and cylinder, one of which is stationarily mounted and the other of which is connected with the movable part of said motor forming a suction pump operable to develop a suction in the cylinder as the motor moves the second mold part toward the first mold part, a valve operable for connecting the cylinder with the cavity to evacuate the cavity when the mold parts close, an injection plunger beneath the first mold part, means also operated by said motor for supplying molten die cast material to the plunger, and means for actuating the plunger to drive the said material into the evacuated cavity.

5. In a die casting machine; a bed, a first mold part support on the bed, a reciprocable motor in alignment with the first mold part, a second mold part carried by the movable portion of the motor so as to be brought together with the first mold part to define a cavity, stationary cylinder means, piston means in the cylinder means, piston rod means connected with the piston means and with the said movable part of the motor whereby closing of the second mold part on the first mold part will develop a suction in said cylinder means, conduit means leading from the cylinder means through the second mold part to said cavity, normally closed valve means in said conduit means, means for opening said valve means to apply the suction developed to the cavity and thereby evacuate said gases in the cavity when the mold parts close, and means for introducing molten die casting material through the first mold part into the cavity 6. In a die casting machine; a bed, a first mold part supported on the bed, a reciprocable motor in alignment with the first mold part, a second mold part carried by the movable portion of the motor so as to be brought together with the first mold part to define a cavity, stationary cylinder means, piston means in the cylinder means, piston rod means connected with the piston means and with the said movable part of the motor whereby closing of the second mold part on the first mold part will develop a suction in said cylinder means, conduit means leading from the cylinder means through the second mold part to said cavity, normally closed valve means in said conduit means, means for opening said valve means to apply the suction developed to the cavity and thereby evacuate said gases in the cavity when the mold parts close, and means for introducing molten die casting material through the first mold part into the cavity, said second mold part including passages tapering inwardly away from the cavity connecting the cavity with the conduit means, and there being cooling means associated with the passage means whereby the die cast material injected into the cavity will crystallize in the said passage means.

7. In a molding machine; a lower mold part, an upper mold part reciprocable to and from the first mold part adapted to define a cavity therewith, a motor for so moving the second mold part, a vacuum pump operated by the motor operable for evacuating the cavity when the mold parts are closed, a first rotary turret member supporting said first mold part, a second rotary turret member rotatable on a center laterally displaced from the center of rotation of the first turret member engaging the back of the first turret member, passage means extending through the first mold part and the said turret members and a recess in the underside of the second turret member into which the passage means open, a chamber for molding material registering with the recess, a pump for molten material also operated by the said motor for transferring measured charges of the molding material into said chamber when the mold parts are closed, a plunger in the chamber movable for transferring the material into said recess and through the passage means into the evacuated cavity whereby all of the material is discharged from the chamber, means for indexing said turret members whereby the runners of the material extending through the passage means are sheared off where the turret members engage each other, and means for ejecting the residue of the material from the passage means and recess in the second turret member.

8. In a molding machine; a movable mold part, a reciprocable motor supporting the mold part, a rotatable turret supporting a plurality of stationary mold parts indexable to bring the stationary mold parts in alignment with the movable mold part, said motor being operable for closing the movable mold part on the stationary mold part aligned therewith and for simultaneously evacuating the mold cavity defined by the mold parts, a second turret engaging the back of the first turret and rotatable on a center laterally displaced from the center of rotation of the first turret, passage means extending through said turret members and the stationary mold parts on the first turret and a recess in the underside of the said turret communicating with said passage means, a chamber for molding material engaging the back of the second turret in alignment with the stationary mold half that is in molding position, a pump for molten material also operated by said motor for transferring measured charges of molding material into said chamber, a plunger in said chamber movable for displacing the molding material into the recess aligned with the chamber and through said passage means into the evacuated cavity, means for driving said turrets in rotation whereby to carry molded parts away from the molding position while simultaneously shearing off the runners extending through the passage means in said turrets, and means also operated by said motor for ejecting the residue of molding material retained in each said recess in the second turret and in the passage means leading therefrom.

9. In a machine for die casting windings into electric motor rotors; laterally spaced vertical rods, an upper turret member rotatable on one of said rods and having a plurality of first mold parts for engaging the lower ends of rotors, a movable mold part adapted for engaging the other ends of the rods in one indexed position of the first turret member, a second turret member rotatable on the other rod and engaging the back of the first turret member and comprising recesses adapted for registering with the movable mold part in one indexed position, passage means in the turret members and first mold part communicating the recesses with the mold parts for delivery of the die cast material thereto, a chamber beneath the second turret member for receiving die cast material, a plunger for driving the die cast material from the recess and through the passage means and mold part and into the rotor whereby the residue of molding material is located in the recess and the passage means whereby to hold the rotor in the first turret member when the movable mold part is retracted, and means for indexing the turret members thereby to shear off the runners of the material in the passage means so the said residue is conveyed away from the said chamber.

10. A method of die casting in a cavity defined by separable vertically arranged mold parts which comprises; moving the mold parts together to close the cavity, developing a reduced pressure in response to the said movement of the mold parts, connecting the reduced pressure with the cavity through the top of the upper of the mold parts substantially simultaneously with the closing of the cavity, and injecting die casting material into the cavity upwardly through the lower one of the said mold parts, and preventing the said die casting material from passing through the said upper one of the mold parts to the source of reduced pressure.

References Cited in the file of this patent
UNITED STATES PATENTS

| | | |
|---|---|---|
| 981,438 | Link et al. | Jan. 10, 1911 |
| 1,960,992 | During et al. | May 29, 1934 |
| 2,326,164 | Payne | Aug. 10, 1943 |
| 2,330,274 | Fiske | Sept. 28, 1943 |
| 2,610,372 | Schroeder | Sept. 16, 1952 |
| 2,635,310 | Morgan | Apr. 21, 1953 |
| 2,668,985 | Babbitt | Feb. 16, 1954 |
| 2,842,798 | Paschold | July 15, 1958 |